United States Patent [19]

Duke

[11] Patent Number: 4,854,626
[45] Date of Patent: Aug. 8, 1989

[54] FISH RETRIEVING TOOL

[76] Inventor: Roger S. Duke, 713 N. 32nd, E. St. Louis, Ill. 62205

[21] Appl. No.: 148,664

[22] Filed: Jan. 26, 1988

[51] Int. Cl.⁴ .............................................. B25J 1/00
[52] U.S. Cl. .................................. 294/19.1; 294/104; 81/423; 43/5
[58] Field of Search ............................ 7/106; 43/5 K; 294/19.1, 104, 50.9; 81/99, 57.43, 423

[56] References Cited

U.S. PATENT DOCUMENTS

| | | | |
|---|---|---|---|
| 1,533,429 | 4/1925 | Koehn | 294/104 |
| 2,279,809 | 4/1942 | Apfel | 294/104 |
| 2,522,454 | 9/1950 | Lewry | 294/19.1 |
| 3,667,798 | 6/1972 | Rusztowicz | 294/194 |
| 3,844,602 | 10/1974 | Johansson | 43/5 |
| 4,005,897 | 2/1977 | Smith | 294/19.1 |
| 4,057,863 | 11/1977 | Bewley | 7/5.4 |
| 4,059,869 | 11/1977 | Dunstheimer | 17/44 |
| 4,160,563 | 7/1979 | Whitney | 294/104 |
| 4,208,749 | 6/1980 | Hermann | 7/106 |

FOREIGN PATENT DOCUMENTS

| | | | |
|---|---|---|---|
| 5347 | of 1884 | United Kingdom | 43/5 |
| 1314717 | 4/1973 | United Kingdom | 81/423 |

Primary Examiner—Roscoe V. Parker
Attorney, Agent, or Firm—Don W. Weber

[57] ABSTRACT

A fish retrieving tool is presented comprising a main frame having a hollow handle, a shaft and a lower stationary jaw; an upper, pivotably attached jaw; a spring for biasing said jaws in a normally open position and a mechanism for closing the jaws when necessary. The upper jaw is biased open by a pair of flat springs. The jaws are closed by operating a lever in the hollow handle which in turn applies a compression force to the upper jaw which over comes the normally open bias of the jaws.

5 Claims, 1 Drawing Sheet

FISH RETRIEVING TOOL

BACKGROUND OF THE INVENTION

This invention relates to fishing and to a tool which eanbles the fisherman to retrieve a fish without the necessity of actually using one's bare hand to do so. As is commonly known in the fishing art, many fish have dangerous teeth and/or sharp scales. Retrieving nets for fisherman have long been known in the art. These nets are used to scoop fish from the lake or stream after they have been hooked. The fish are then kept on a stringer or are thrown into a bucket of water or special container for keeping the fish fresh. They must be retrieved from this container once more to clean and scale the fish before they are ready to cook. If the bare hand is used, the fisherman may frequently be injured due to handling the fish.

The present invention relate to a useful tool for retrieving fish from a stream, once caught on a hook, or from a holding container. The tool is rigid and acts as an extension of the hand. The fish may be held in a particular desired position, unlike fish held in a net.

It is an object of this invention to make a device which will retrieve a fish on a hook or to move a fish from a container to a cleaning area without the necessity of using a fisherman's bare hand.

Another object of this invention is to provide a tool that will permit a fisherman to position a caught fish for cleaning, filleting and other preparation.

Still, another object of this invention is to enable a fisherman to handle a fish for any purpose safely and conveniently. Other and further objects of this invention will become apparent in the following specification.

BRIEF SUMMARY OF THE INVENTION

The device herein comprises a main frame (1) which has a handle (2) at one end, a shaft (3) attached thereto, and a lower, stationary jaw (4) attached at the remaining end of the shaft. Pivotably attached to the lower, stationary jaw is an upper jaw (5). The upper and lower jaws are normally biased open, or apart, by a pair of flat tension springs each having its legs positioned against each jaw. A closing member connects the upper jaw to a closing lever located in the handle of the device.

Biased in an open position, a fisherman activates the jaws by pulling on a closing lever. This lever in turn exerts an inward force on the upper jaw and overcomes the tension spring, thus closing the jaws.

Each jaw has attached thereto a set of teeth which hold the fish firmly. The teeth are detachable, and different sets of teeth may be used depending on the type of fish involved.

To protect the teeth, a set of plastic protective covers, or lips, may be used. To close the jaw for storage, a closer is provided.

DETAILED DESCRIPTION OF THE PREFERRED EMBODIMENT

Figure 1:
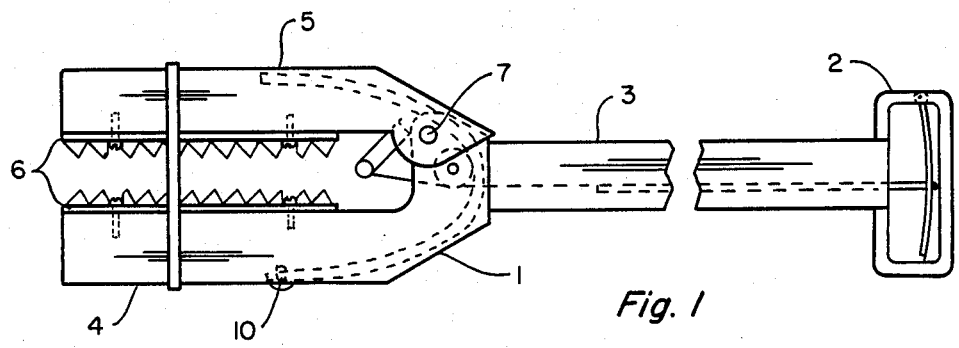
FIG. 1 is a side view of the device with the storage close in place.

The device as set out herein comprises a main frame (1) which includes a handle (2) at one end, shaft (3) of approximately two feet in length attached to the handle, and a lower jaw (4) attached at the other end of the shaft. The entire device could be fabricated from durable aluminum material, utilizing both forging and stamping procedures to form.

The handle (4) is basically rectangular, but the inner portion is hollow, the metal forming a perimeter of rectangular dimensions, The handle could be made of tubular metal or any other suitable material.

The shaft (3) is connected to the handle and is hollow. The shaft is preferably formed of tubular metal stock. The other end of the shaft would be connected to the lower jaw.

The lower jaw (4) preferably has a square cross-section and would likewise be hollow. Each jaw would have one flat surface (6) facing inwardly toward the logitudinal center of the device so as to form two opposing flat surfaces. The handle, shaft and lower jaw are preferably forged and formed of one solid piece but could be suitably attached as component parts.

The second, upper, jaw (5) is then pivotably attached about an upper jaw pivot point (7). The attaching means includes either rivets or a pivot pin placed entirely through the upper and lower jaws at the pivot point. The upper jaw also has a flat surface (6). The upper and lower flat surfaces are parallel to each other and opposing. Detachably secured to the flat surfaces are the device's teeth (8). The teeth may be made of steel, aluminum or hard plastic depending upon the uses and types of fish being retrieved. The teeth are suitably attached by means of screws or other similar equivalent attaching means.

Figure 2:
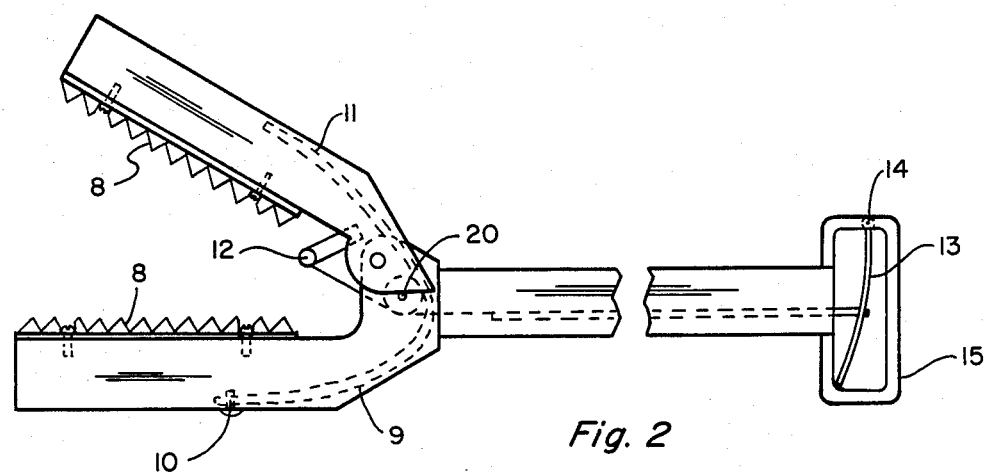
FIG. 2 is a side view of the device with the jaws open.

In order to keep the jaws in a normally open position, a tensioning spring may be pivotably secured inside the jaws about a tensioning spring pivot point (20). One leg of the spring would be held against the lower jaw, and the other leg is positioned against the upper jaw. This spring then biases the jaws apart, or in an open position. Another and preferred method of biassing the jaws open would be to attach a fair of flat tensioning springs (9) inside the jaws. One end of each spring (10) would be fixedly attached to the stationary jaw as shown in FIG. 2. The other end of said springs (11) then lie against the frame and upper jaw as shown, providing an open bias to the device jaws.

Figure 3:
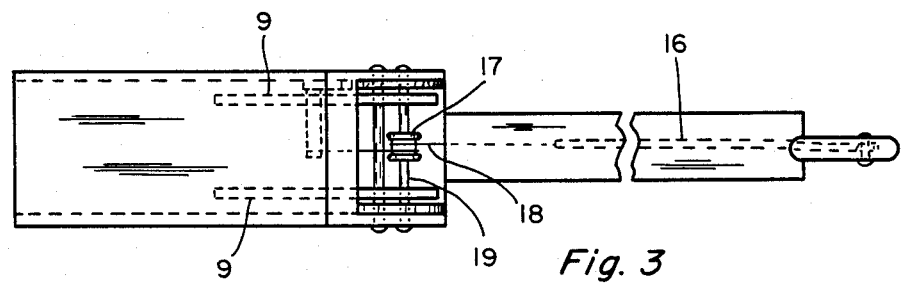
FIG. 3 is a top view of the device showing the pully and two springs.
Figure 4:
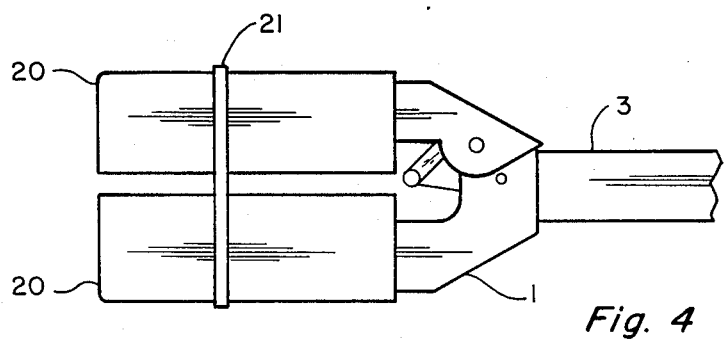
FIG. 4 is a side view of the device with the jaw teeth protected by molded legs and with the storage close in position to overcome the tension from the two springs.

The jaws are closed by any convenient means. The preferred embodiment of the closing means is shown in FIG. 3.

To the upper jaw there is fixedly attached a closing arm (12). This arm is most suitably welded or forged intact to the upper jaw (5). Inside the perimeter of the handle there is pivotably attached a closing lever (13) at a closing lever pivot point (14). The lever moves towards the end of the device (15) to close the jaws, but is normally held towards the jaw-end of the tool by the tension spring (9). A closing rod is pivotably connecting to the lever (13) and the arm (12). As the lever (13) is pivotted towards the end of the handle (15), the upper jaw (5) pivots downwardly to close the upper jaw on the lower jaw (4).

An alternate embodiment for the closing means adds a pulley (17) and a flexible connecting member (18). The pulley is rotably secured about a pulley shaft (19) which is fixedly secured inside the base of the jaws as shown in FIG. 3. The pulley may vary in size and is used to lower the hand tension required to be placed on the lever (13). In this alternate embodiment, a short closing rod (16) is used. A first end of the short closing rod is pivotably attached to the handle at the closing rod pivot point (14) as before. However, the short rod terminates in the shaft a small space before the pulley. A flexible connecting member (18) is then attached to a second end of the short rod. The flexible connecting member then loops around the pulley and is attached to the closing arm (12). In this embodiment, the pulley mechanism and short rod replace the direct-drive rod as previously described.

To protect the teeth when the device is not in use, a pair of plastic lips may be positioned over the upper and lower jaws. The lips would be molded to flexibly fit over the teeth. To keep the jaws closed during storage, a band or storage closer is provided. This band, similar to a strong rubber band, would be placed over the jaw to overcome the tension from the flat springs (9).

The embodiment described herein is found to be the most suitable for use. However, other equivalent substitutes may be utilized where advisable and the description herein is not means to limit the inventor's conception hereof.

Having described my invention, I claim:

1. A fish retrieving tool, comprising:
   (a) an integrally formed main frame having a hollow handle with an essentially rectangular perimeter at one end, a lightweight, hollow shaft in the center and a hollow lower jaw having an essentially square cross-section at the opposite end of said shaft;
   (b) An upper jaw with an essentially square cross-section pivotably attached to said main frame at a first pivot point, wherein said upper and lower jaws form two parallel opposing flat surfaces;
   (c) a set of upper and lower interchangeable jaw teeth detachably secured to the opposing surfaces of said upper and lower jaws, wherein different sets of teeth may be interchangeably attached to said jaws depending upon the uses and types of fish being retrieved;
   (d) A spring means comprising at least one flat tension spring attached at a second tensioning spring pivot point for biasing said jaws in an open position;
   (e) A closing means for pivotting said upper jaw to a closed position, comprising: a closing lever pivotably attached to said handle; a short closing rod having one end pivotably attached to said lever and the other end attached to one end of a flexible connecting member, said flexible connecting member looping around a pulley that is rotatably secured about said second pivot point, the other end of said flexible connecting member being attached to a closing arm, said closing arm being fixedly attached to the upper jaw of the tool;
   whereby said retrieving tool may be easily closed by movement of said closing lever.

2. A fish retrieving tool as in claim 1, wherein said spring means is a pair of flat tension springs each having a first leg fixedly secured inside the lower jaw biasing said lower jaw downward and a second leg tensioned against said upper jaw, biassing said upper jaw upward.

3. A fish retrieving tool as in claim 1, further comprising protective plastic lips which fit over the teeth of said upper and lower jaws to protect the teeth when the device is not in use.

4. A fish retrieving tool as in claim 1, further comprising a storage closer placed over the jaws of said device to hold them closed when the device is not in use.

5. A fish retrieving tool as in claim 1, wherein said set of upper and lower interchangeable teeth may be made of aluminum or hard plastic depending upon the uses and types of fish being retrieved.

* * * * *